United States Patent [19]

Ezaki

[11] Patent Number: 5,329,374
[45] Date of Patent: Jul. 12, 1994

[54] RECORDING AND/OR REPRODUCING APPARATUS WITH PEAKING FREQUENCY DEPENDENT ON ASPECT RATIO

[75] Inventor: Tadashi Ezaki, Kanagawa, Japan

[73] Assignee: Sony Corporation, Tokyo, Japan

[21] Appl. No.: 992,002

[22] Filed: Dec. 17, 1992

[30] Foreign Application Priority Data

Dec. 26, 1991 [JP] Japan .................................. 3-345105

[51] Int. Cl.$^5$ ............................................ H04N 5/78
[52] U.S. Cl. .................................... 358/310; 348/627
[58] Field of Search ............... 358/310, 335, 166, 167, 358/36, 37, 180; 360/33.1, 19.1; H04N 5/78, 9/74

[56] References Cited

U.S. PATENT DOCUMENTS 4,786,986 11/1988 Yamanushi et al. .
5,150,218 9/1992 Ezaki .................................... 358/310

FOREIGN PATENT DOCUMENTS 0440167 8/1991 European Pat. Off. .
0487092 11/1991 European Pat. Off. ....... H04N 9/74
0464772 1/1992 European Pat. Off. .
0510642 10/1992 European Pat. Off. .
WO91/03905 3/1991 PCT Int'l Appl. .

OTHER PUBLICATIONS

Patent Abstracts of Japan, vol. 12, No. 407 (E-675) Oct. 27, 1988 & JP-A-63 146 674 (Matsushita Electric Ind Co Ltd).

Primary Examiner—Victor R. Kostak
Assistant Examiner—Nathan J. Flynn
Attorney, Agent, or Firm—William S. Frommer; Alvin Sinderbrand

[57] ABSTRACT

A recording and reproducing apparatus which can prevent deterioration of the picture quality from being caused by an overshoot, a ringing or a noise component when, using a video tape recorder which can process two kinds of video signals having different aspect ratios, a video signal having a greater one of the aspect ratios is reflected on a television set. The recording and reproducing apparatus comprises a peaking circuit for adding an overshoot or a ringing to a video signal, a noise canceller circuit for cancelling noise from the video signal and a comb line filter for removing noise from the video signal. The peaking circuit, the noise canceller circuit and the comb line filter are capable of changing over the peaking frequency, the noise cancelling characteristic and the comb line filter characteristic thereof, respectively, in accordance with an aspect ratio of the video signal.

2 Claims, 8 Drawing Sheets

ASPECT RATIO 4:3

IMAGE

ASPECT RATIO 16:9

IMAGE

ASPECT RATIO 4:3
OVERSHOOT

ASPECT RATIO 16:9
OVERSHOOT

ASPECT RATIO 4:3

ASPECT RATIO 16:9

RECORDING AND/OR REPRODUCING APPARATUS WITH PEAKING FREQUENCY DEPENDENT ON ASPECT RATIO

BACKGROUND OF THE INVENTION

1. Field of the Invention

This invention relates to a recording and reproducing apparatus which can record and reproduce two kinds of video signals having different aspect ratios.

2. Description of the Related Art

Conventionally, television sets normally have an aspect ratio of 4:3 as seen from FIG. 9(a). Accordingly, video apparatus which are connected in use to a television set, such as, for example, video tape recorders, are produced so as to match the aspect ratio.

On the other hand, high definition television sets which have been developed recently include a number of scanning lines equal to twice that of conventional television sets and have a different aspect ratio of 16:9 as seen from FIG. 9(b). Accordingly, a video image which is high in picture quality and provides the feeling of presence can be obtained on a high definition television set. However, since high definition television sets are considerably expensive in the present condition, television sets having the same number of scanning lines of 525 as that of conventional television sets but having the different aspect ratio of 16:9 are produced.

Consequently, also video tape recorders are required to treat a video signal wherein the number of scanning lines is 525 and the aspect ratio is 16:9. However, since television sets having the aspect ratio of 4:3 prevail in the present condition, video tape recorders which can record and reproduce both of a video signal having the aspect ratio of 4:3 and another video signal having the aspect ratio of 16:9 are produced.

In a video tape recorder of the type just described, aspect ratio information for the distinction between the aspect ratios of 4:3 and 16:9 is recorded in a superimposed condition at a control portion or a vertical blanking portion of a video signal.

A video tape recorder which can record and reproduce two different video signals having the different aspect ratios in this manner is normally constructed such that video signals having the different aspect ratios are processed in the same transmission band.

In a video tape recorder of the type described above, when a video signal having the aspect ratio of 4:3 as seen in FIG. 9(a) is to be recorded, a predetermined overshoot is added in order to emphasize a contour of an image as seen from FIG. 10(a).

On the other hand, when another video signal having the aspect ratio of 16:9 as seen in FIG. 9(b) is to be recorded, since it is recorded in the same transmission band as a video signal having the aspect ratio of 4:3 as described above, the video signal is reduced in the horizontal direction as seen from FIG. 10(b) and an overshoot similar to that which is added to a video signal having the aspect ratio of 4:3 is added to the video signal.

As seen in FIG. 11(a), the width A of an overshoot when a video signal having the aspect ratio of 4:3 is reflected on a television set is set to a value at which the picture quality is not deteriorated. However, if a video signal having the aspect ratio of 16:9 is reflected in this condition on the television set as seen in FIG. 11(b), the image is expanded in the horizontal direction, and also the width B of the overshoot is expanded in the horizontal direction. Consequently, the picture quality is deteriorated.

A similar phenomenon occurs not only in overshoot but also in any other factor of the picture quality such as a ringing or a noise component.

SUMMARY OF THE INVENTION

It is an object of the present invention to provide a recording and reproducing apparatus which can prevent deterioration of the picture quality from being caused by an overshoot, a ringing or a noise component when, using a video tape recorder which can process two kinds of video signals having different aspect ratios, a video signal having a greater one of the aspect ratios is reflected on a television set.

In order to attain the object, according to an aspect of the present invention, there is provided a recording and reproducing apparatus for recording and reproducing a video signal having a first aspect ratio and another video signal having a second aspect ratio higher than the first aspect ratio, which comprises reproducing means for reproducing a video signal, means for detecting a brightness signal of the reproduced video signal, reproducing and detecting means for reproducing and detecting aspect ratio information, and peaking means for adding an overshoot or a ringing to the detected brightness signal with a predetermined peaking frequency, the peaking means being capable of changing over the peaking frequency in accordance with the aspect ratio information from the reproducing and detecting means so that the width of an overshoot or a ringing applied to a video signal having the second aspect ratio may be smaller than the width of an overshoot or a ringing applied to another video signal having the first aspect ratio.

In the recording and reproducing apparatus, the peaking frequency of the peaking means is changed over in accordance with an aspect ratio represented by the aspect ratio information of the video signal. Consequently, when the video signal has the second aspect ratio higher than the first ratio, the width of an overshoot or a ringing applied to the video signal is reduced. Consequently, even when the video signal is reflected on a television set, the overshoot or the ringing appears within a suitable width. As a result, otherwise possible deterioration of the picture quality by an overshoot or a ringing can be prevented.

According to another aspect of the present invention, there is provided a recording and reproducing apparatus for recording and reproducing a video signal having a first aspect ratio and another video signal having a second aspect ratio higher than the first aspect ratio, which comprises reproducing means for reproducing a video signal, means for detecting a brightness signal of the reproduced video signal, reproducing and detecting means for reproducing and detecting aspect ratio information, and noise cancelling means for cancelling noise components of the detected brightness signal, the noise cancelling means being capable of changing over the noise cancelling characteristic thereof in accordance with the aspect ratio information from the reproducing and detecting means so that the width of noise components of a video signal having the second aspect ratio may be smaller than the width of noise components of another video signal having the first aspect ratio.

With the recording and reproducing apparatus, the noise cancelling characteristic of the noise cancelling means is changed over in accordance with an aspect ratio represented by the aspect ratio information of the video image so that the width of noise components of a video signal having the second aspect ratio higher than the first aspect ratio may be smaller than the width of noise components of another video signal having the first aspect ratio. Consequently, even when a video signal having the second aspect ratio higher than the first aspect ratio is reflected on a television set, the width of noise components of the image is small and the noise components are not emphasized. As a result, otherwise possible deterioration of the picture quality by noise can be prevented.

According to a further aspect of the present invention, there is provided a recording and reproducing apparatus for recording and reproducing a video signal having a first aspect ratio and another video signal having a second aspect ratio higher than the first aspect ratio, which comprises reproducing means for reproducing a video signal, means for detecting a brightness signal of the reproduced video signal, reproducing and detecting means for reproducing and detecting aspect ratio information, and comb line filter means for removing noise components of the detected brightness signal, the comb line filter means being capable of changing over the comb line filter characteristic thereof in accordance with the aspect ratio information from the reproducing and detecting means so that the width of noise components of a video signal having the second aspect ratio may be smaller than the width of noise components of another video signal having the first aspect ratio.

With the recording and reproducing apparatus, the comb line filter characteristic of the comb line filter means is changed over in accordance with an aspect ratio represented by the aspect ratio information of the video image so that the width of noise components of a video signal having the second aspect ratio higher than the first aspect ratio may be smaller than the width of noise components of another video signal having the first aspect ratio. Consequently, even when a video signal having the second aspect ratio higher than the first aspect ratio is reflected on a television set, the width of noise components of the image is small and the noise components are not emphasized. As a result, otherwise possible deterioration of the picture quality by noise can be prevented.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
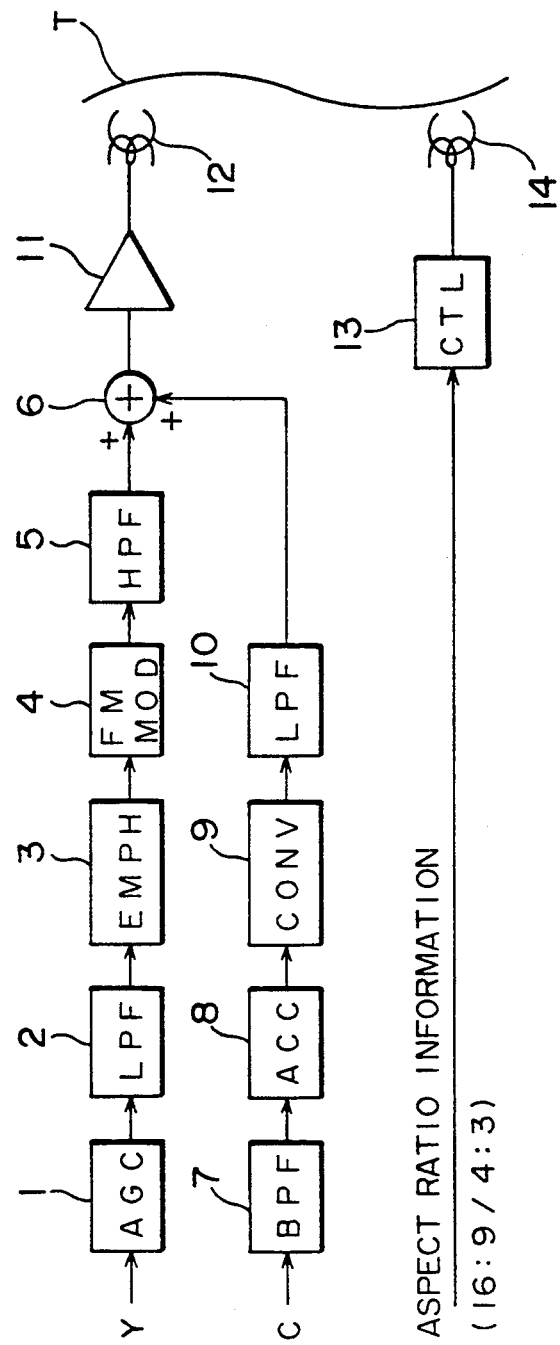
FIG. 1 is a block diagram of a recording system of a video tape recorder to which a recording and reproducing apparatus according to the present invention is applied.

Referring first to FIG. 1, there is shown a recording system of a video tape recorder to which a recording and reproducing apparatus according to the present invention is applied. The recording system includes an AGC (automatic gain control) circuit 1 which receives a brightness signal Y of a video signal inputted, for example, from a video camera not shown and controls the gain of the brightness signal Y. The brightness signal Y is then supplied by way of a low-pass filter (LPF) 2 to an emphasis (EMPH) circuit 3, at which predetermined emphasis is applied to the brightness signal Y.

The brightness signal Y is then FM modulated by an FM (frequency modulation) modulating circuit 4 and supplied to a mixing circuit 6 by way of a high-pass filter (HPF) 5.

Meanwhile, a color signal C of the video signal is supplied by way of a band-pass filter (BPF) 7 to an ACC circuit 8, at which the amplitude of the color signal C is adjusted. The color signal C is then frequency converted by a frequency converting circuit (CONV) 9 and then supplied to the mixing circuit 6 by way of a low-pass filter (LPF) 10.

The brightness signal Y and the color signal C are mixed at the mixing circuit 6, and the mixture signal is supplied by way of a recording amplifier 11 to a video head 12, by which the mixture signal, i.e., a video signal, is recorded onto a video track of a record tape T.

Further, in the video tape recorder, aspect ratio information representing whether the aspect ratio of the input video signal is 4:3 or 16:9 is supplied by way of a control signal controlling circuit 13 to a control head 14, by which it is recorded onto a control track of the record tape T.

Here, the aspect ratio information is set such that the high signal level represents the aspect ratio of 4:3 and the low signal level represents the aspect ratio of 16:9.

Figure 2:
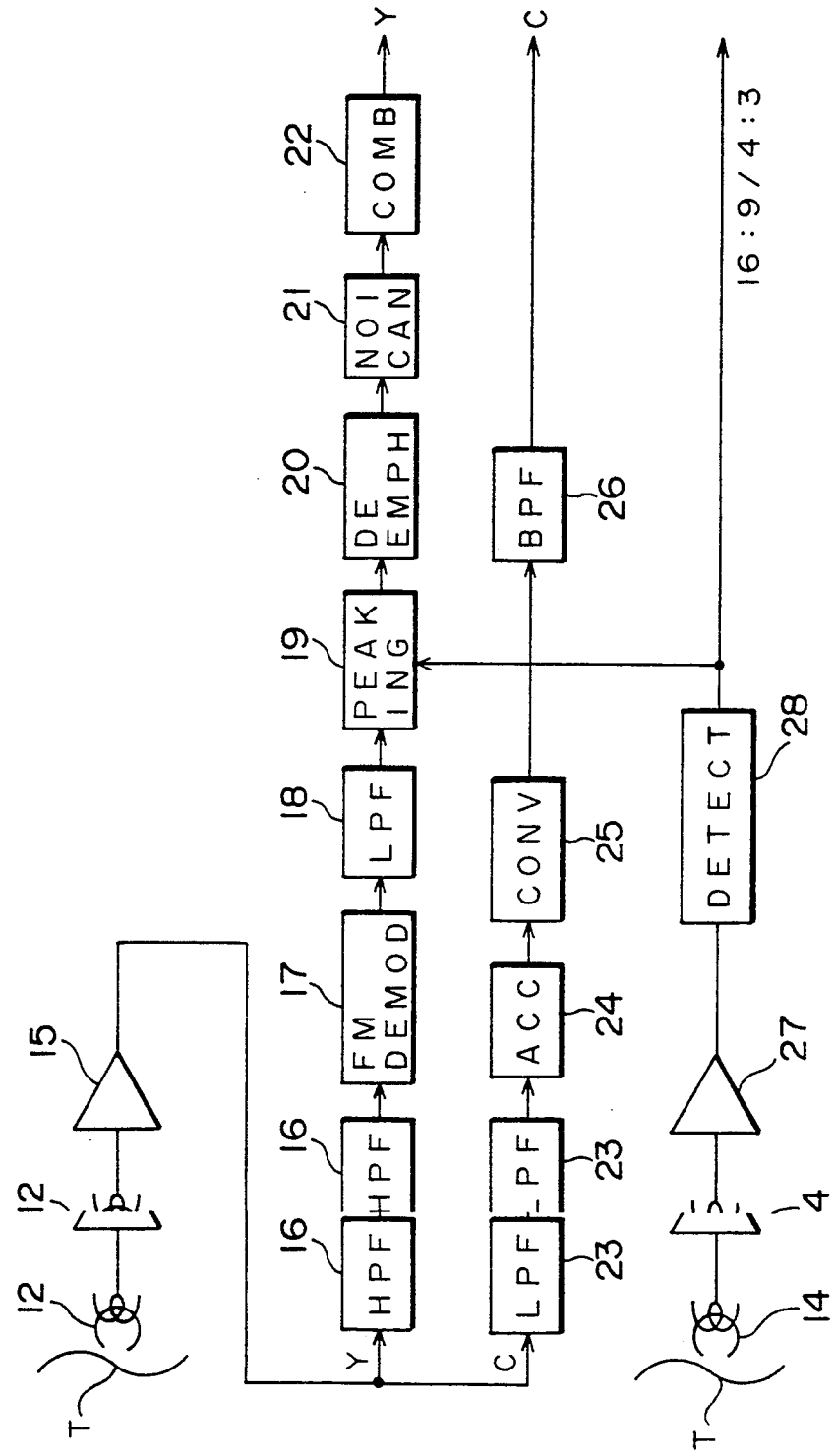
FIG. 2 is a block diagram of a reproducing system of the video tape recorder.

Referring now to FIG. 2, there is shown a reproducing system of the video tape recorder. The video signal recorded on the record tape T is reproduced by the video head 12 and amplified by a reproduction amplifier 15.

The brightness signal Y of the video signal is supplied by way of a high-pass filter (HPF) 16 to an FM demodulating circuit 17, at which it is detected. The thus demodulated brightness signal Y is supplied by way of a low-pass filter (LPF) 18 to a peaking circuit 19, at which an overshoot is added to the brightness signal Y. In the embodiment shown, the width of the overshoot can be varied by varying the center frequency of the peaking circuit 19 in accordance with the aspect ratio of the video signal as hereinafter described.

The brightness signal Y outputted from the peaking circuit 19 is outputted to the outside by way of a de-emphasis circuit 20, a noise canceller 21 and a comb line filter 22.

Meanwhile, the color signal C of the video signal from the reproduction amplifier 15 is outputted to the outside by way of a low-pass filter (LPF) 23, an ACC circuit 24, a frequency converting circuit (CONV) 25 and a band-pass filter (BPF) 26.

Meanwhile, the control signal recorded on the control track of the record tape T is reproduced by the control head 14 and supplied to a detector (DETECT) 28 by way of an amplifier 27. At the detector 28, the aspect ratio information included in the control signal is detected. The aspect ratio information thus detected is on one hand supplied to the peaking circuit 19 and on the other hand introduced to a connecting terminal not shown to the outside.

Figure 3:
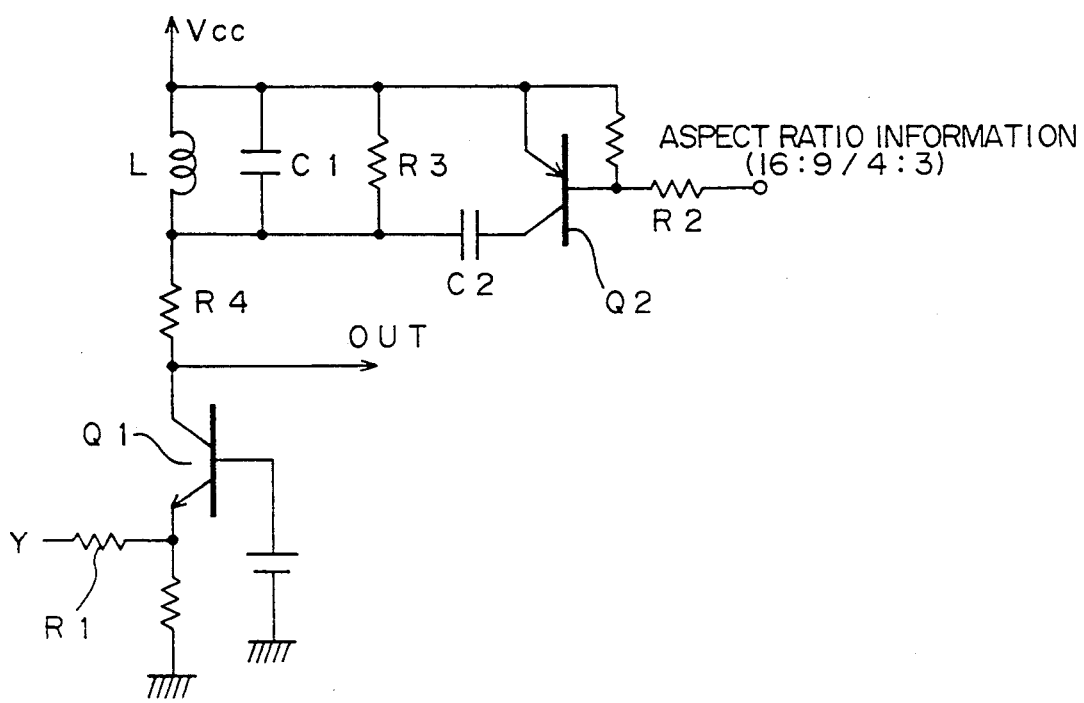
FIG. 3 is a circuit diagram of a peaking circuit.

Referring now to FIG. 3, detailed construction of the peaking circuit 19 is shown. The peaking circuit 19 shown receives an input brightness signal Y at a resistor R1. The input brightness signal Y from the resistor R1 is amplified by a PNP transistor Q1.

Meanwhile, aspect ratio information is supplied to another PNP transistor Q2 by way of another resistor R2. Here, when the aspect ratio is 4:3, a high level signal is supplied, and consequently, the PNP transistor Q2 is turned on. On the other hand, when the aspect ratio is 16:9, a low level signal is supplied so that the PNP transistor Q2 is turned off.

Consequently, when the aspect ratio is 4:3, a resonance circuit is constructed wherein a coil L, a pair of capacitors C1 and C2 and a resistor R3 are connected in parallel. If it is assumed that the reference characters applied to the individual elements represent respective values of them, then the resonance frequency f1 of the resonance circuit is given by $$f1 = \tfrac{1}{2}\pi(L(C1+C2))^{\frac{1}{2}}$$

Figure 4:
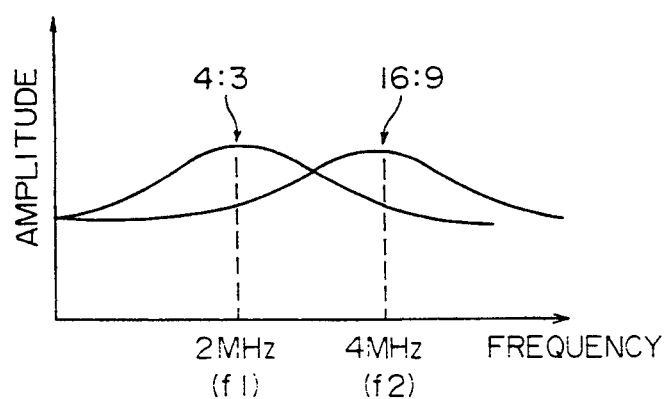
FIG. 4 is a diagram showing a resonance frequency of the peaking circuit.

In the present peaking circuit 19, the resonance circuit is constructed so that the resonance frequency f1 thereof may be 2 MHz as seen from FIG. 4.

The resonance frequency f1 generated by the resonance circuit is superimposed by way of a resistor R4 (FIG. 3) on the brightness signal Y to make an overshoot and then forwarded to the de-emphasize circuit 20 (FIG. 2). The width of the overshoot then is set so that a video image reflected on a television set may not look ugly.

On the other hand, when the aspect ratio is 16:9, since the PNP transistor Q2 presents an off state, the resonance circuit is constructed except the capacitor C2, and the resonance frequency f2 of the resonance circuit then is given by $$f2 = \tfrac{1}{2}\pi(L\times C1)^{\frac{1}{2}} > f1$$

In the present peaking circuit 19, the resonance circuit is constructed so that the resonance frequency f2 thereof may be 4 MHz as seen from FIG. 4. Consequently, the width of an overshoot when a video image having the aspect ratio of 16:9 is reproduced is smaller than that of an overshoot when a video signal having the aspect ratio of 4:3 is reproduced.

Consequently, when a video signal having the aspect ratio of 16:9 is to be reproduced and reflected on a television set, even if an overshoot added by a video tape recorder is expanded in the horizontal direction, it will have an extent substantially similar to that of an overshoot of a video image having the aspect ratio of 4:3. Accordingly, otherwise possible deterioration by the overshoot can be prevented. It is to be noted that also a ringing is processed similarly as in processing of an overshoot.

According to the present invention, deterioration of the picture quality by expansion of a noise component when a video image having a higher aspect ratio is reproduced and reflected on a television set can be prevented by changing over the characteristic of the noise canceller 21 of the video tape recorder described above in accordance with an aspect ratio.

Figure 5:
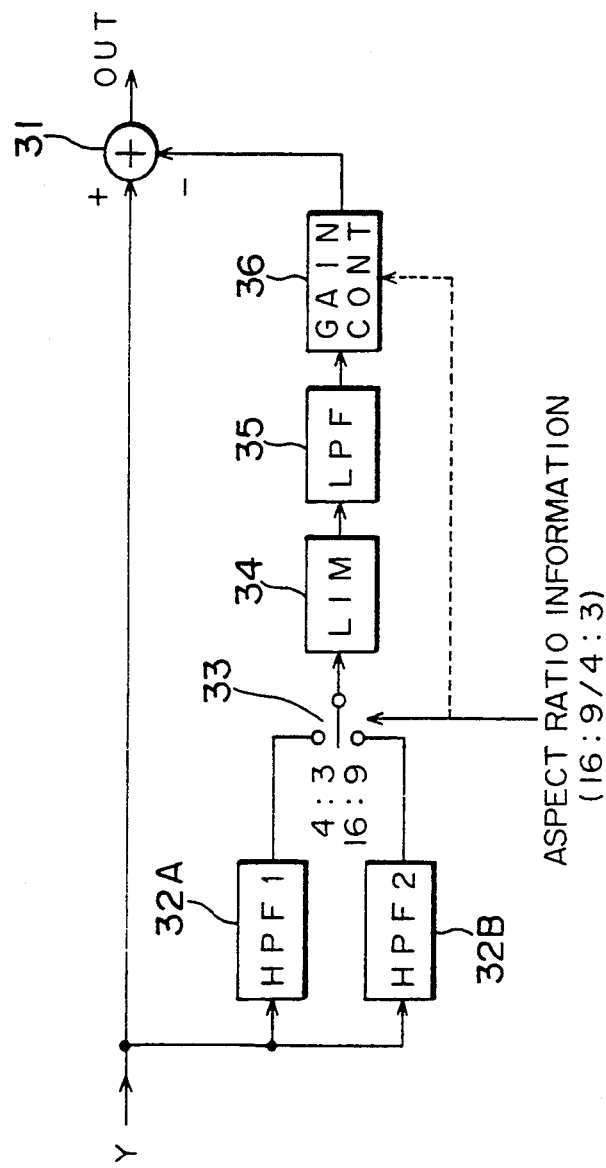
FIG. 5 is a block diagram of a noise canceller.

Referring now to FIG. 5, detailed construction of the noise canceller 21 is shown. A brightness signal Y inputted to the noise canceller 21 is supplied to a subtractor 31 and also to a pair of high-pass filters (HPF1, HPF2) 32A and 32B, at which high frequency components of the brightness signal Y are extracted.

Figure 6:
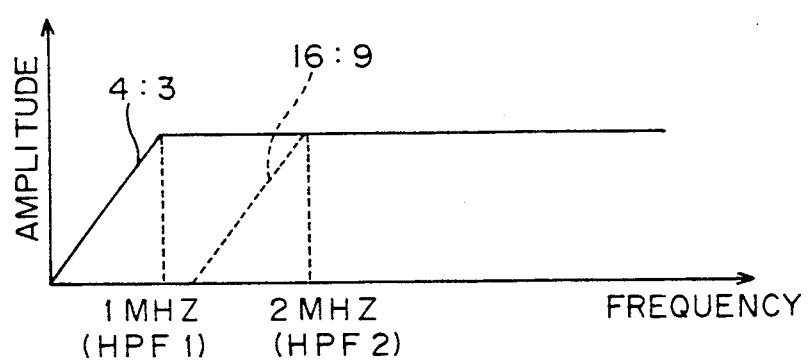
FIG. 6 is a diagram showing a characteristic of a high-pass filter.

The characteristics of the high-pass filters 32A and 32B are set in such a manner as shown in FIG. 6. In particular, referring to FIG. 6, the high-pass filter 32A in the present noise canceller 21 has a pass band of 1 MHz or more while the other high-pass filter 32B has another pass band of 2 MHz or more.

The outputs of the high-pass filters 32A and 32B are selectively changed over in response to an aspect ratio by means of a change-over switch 33. In particular, when the aspect ratio is 4:3, the switch 33 is changed over to the high-pass filter 32A side, but when the aspect ratio is 16:9, the switch 33 is changed over to the high-pass filter 32B side.

The high frequency components outputted from the high-pass filter 32A or the high-pass filter 32B in this manner are supplied to a limiter (LIM) 34, at which amplitude variations are removed from the high frequency components to extract noise components. The noise components are supplied by way of a low-pass filter 35 to a gain controller 36. A gain of the noise components is set to a predetermined value at the gain controller 36, and then, the noise components are supplied to the subtractor 31.

The noise components are subtracted from the brightness signal Y at the subtractor 31. Consequently, the noise components are removed from the video signal.

Where the noise canceller 21 constructed in such a manner as described above is employed, when a video signal having the aspect ratio of 16:9 is reproduced, noise components on the higher frequency side than those when a video signal having the aspect ratio of 4:3 is reproduced are removed. Consequently, even if the video signal is expanded in the horizontal direction when it is reflected on a television set, no striking noise can be observed on the image.

It is to be noted that, while the high-pass filter 32A and the high-pass filter 32B which have different characteristics from each other are selectively used in accordance with an aspect ratio, the characteristic of the gain controller 36 may be varied simultaneously in accordance with the aspect ratio.

Figure 7:
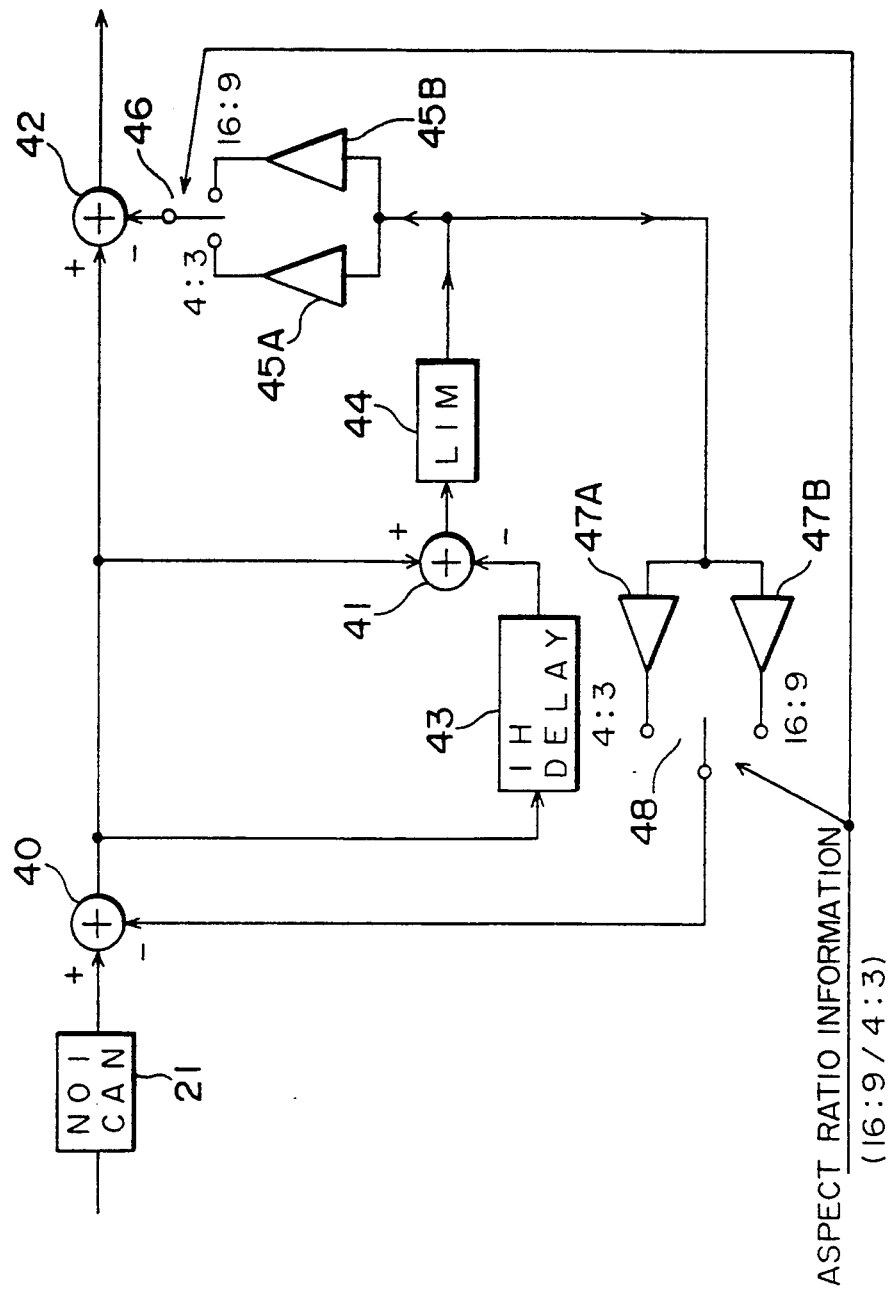
FIG. 7 is a block diagram of a comb line filter.

According to the present invention, the characteristic 22 of the comb line filter (COMB) 22 which is provided to reduce noise components may be varied in accordance with an aspect ratio. FIG. 7 shows detailed construction of the comb line filter 22.

Referring to FIG. 7, a video signal supplied from the noise canceller 21 to the comb line filter 22 is then supplied by way of a subtractor 40 to a pair of subtractors 41 and 42 and a 1H delay circuit 43.

At the subtractor 41, a video image of last frame supplied thereto from the 1H delay circuit 43 is subtracted from another video image of the present frame to extract high frequency components, and the high frequency components pass through a limiter 44 to extract noise components. The noise components are supplied to a pair of gain amplifiers 45A and 45B, at which they are individually set to different predetermined gains.

The outputs of the gain amplifiers 45A and 45B are selectively supplied by way of a change-over switch 46 to the subtractor 42, at which the selected output is subtracted from the video signal at present. Consequently, a video image in which noise components have been reduced can be obtained.

Here, the gain amplifier 45B is set so that it has a gain higher than the gain of the other gain amplifier 45A.

The change-over switch 46 is changed over in accordance with aspect ratio information. In particular, the change-over switch 46 is changed over to the gain amplifier 45A side when the aspect ratio is 4:3, but when the aspect ratio is 16:9, the change-over switch 46 is changed over to the gain amplifier 45B side.

Figure 8:
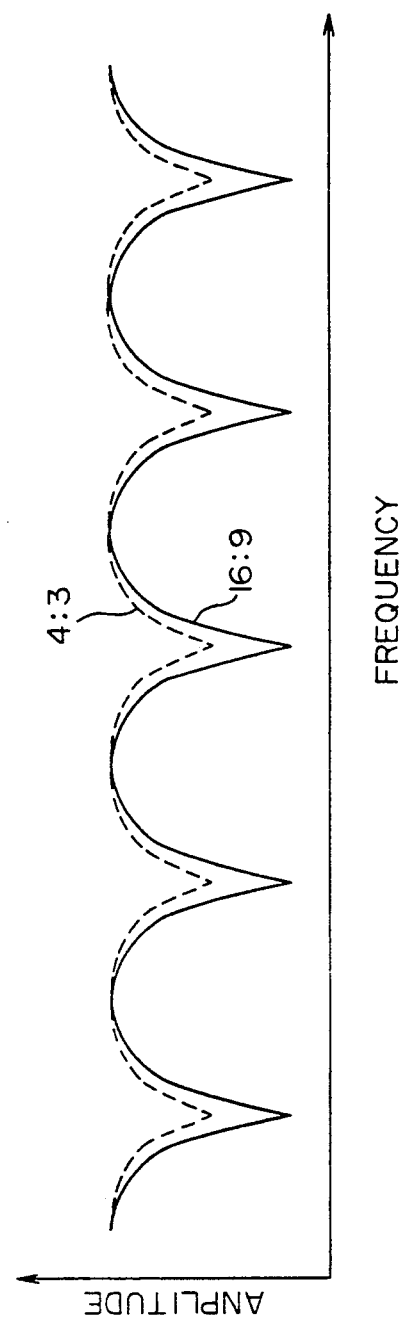
FIG. 8 is a diagram showing a characteristic of the comb line filter.
Figure 9A:
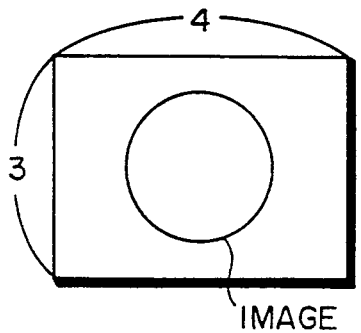
FIGS. 9(a) and 9(b) are diagrammatic views showing aspect ratios of television sets.
Figure 9B:
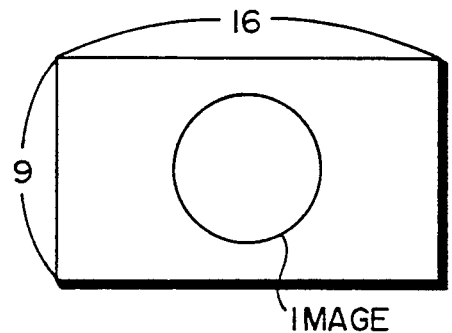
Figure 10A:
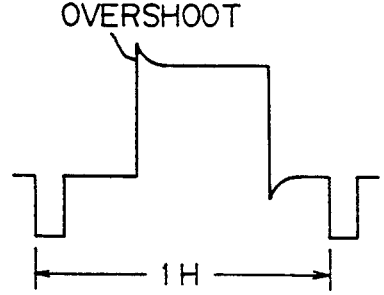
FIGS. 10(a) and 10(b) are diagrams illustrating video signals of the aspect ratios.
Figure 10B:
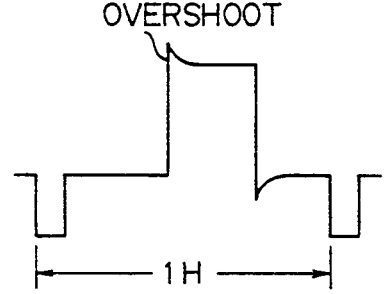
Figure 11A:
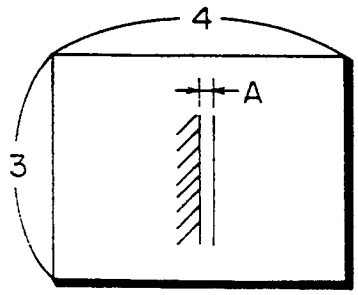
FIGS. 11(a) and 11(b) are diagrammatic views showing overshoots.
Figure 11B:
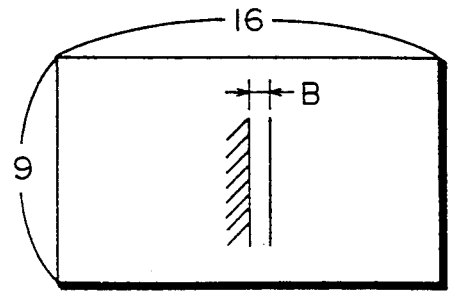

Accordingly, when the aspect ratio is 16:9, a video signal outputted from the subtractor 42 has a smaller amplitude at a predetermined frequency than the amplitude of a video image when the aspect ratio is 4:3 as seen from FIG. 8. Consequently, even when a video signal having the aspect ratio of 16:9 is reproduced, no striking noise can be observed on the screen of a television set.

It is to be noted that, in the comb line filter 22 shown in FIG. 7, the output of the limiter 44 is fed back to the subtractor 40 side, and a pair of gain amplifiers 47A and 47B are interposed in the feedback circuit and the outputs thereof are selectively changed over by a change-over switch 48. Thus, similarly as described above, when the aspect ratio is 16:9, the change-over switch 48 is changed over to the gain amplifier 47B side having a higher gain, but when the aspect ratio is 4:3, the change-over switch 48 is changed over to the gain amplifier 47A side having a lower gain. Consequently, a video signal in which noise has been further reduced can be obtained.

Having now fully described the invention, it will be apparent to one of ordinary skill in the art that many changes and modifications can be made thereto without departing from the spirit and scope of the invention as set forth herein.

What is claimed is:

1. A recording and/or reproducing apparatus for recording and reproducing a first video signal having a first aspect ratio and a second video signal having a second aspect ratio higher than the first aspect ratio, comprising:

reproducing means for reproducing one of said first and second video signals as a reproduced video signal;

means for detecting a brightness signal of the reproduced video signal;

reproducing and detecting means for reproducing and detecting aspect ratio information of the reproduced video signal; and peaking means for adding an overshoot or a ringing to the detected brightness signal with a predetermined peaking frequency, said peaking means being capable of changing over the peaking frequency in accordance with the aspect ratio information from said reproducing and detecting means.

2. A recording and/or reproducing apparatus according to claim 1, wherein said peaking means includes a first transistor for receiving a brightness signal, a resonance circuit connected to said first transistor and consisting of a plurality of elements connected in parallel, and a second transistor for receiving aspect ratio information from said reproducing and detecting means and rendering a particular one of said elements of said resonance circuit effective or ineffective in response to said aspect ratio information so that, when the aspect ratio information represents the second aspect ratio, said resonance circuit may resonate at a frequency higher than the frequency at which said resonance circuit resonates when the aspect ratio information represents the first aspect ratio.

* * * * *